Figure 1:
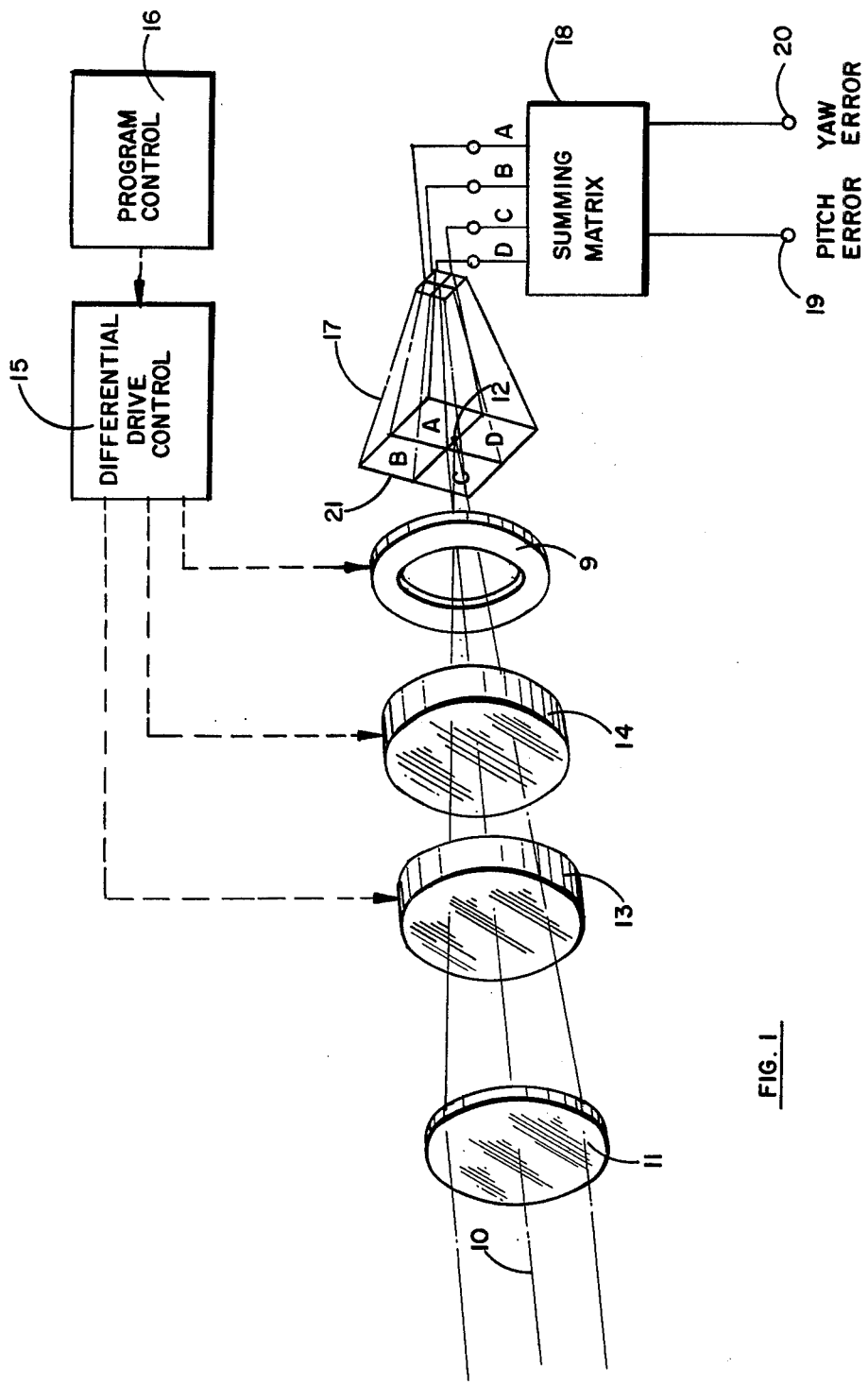

United States Patent [19]

Johnson et al.

[11] 4,006,356

[45] Feb. 1, 1977

[54] RADIANT ENERGY TRACKING DEVICE

[75] Inventors: Jack L. Johnson, Corona del Mar; Reno U. Pierotti, Costa Mesa, both of Calif.

[73] Assignee: Aeronutronic Ford Corporation, Blue Bell, Pa.

[22] Filed: Oct. 27, 1961

[21] Appl. No.: 148,092

[52] U.S. Cl. .......................... 250/203 R; 244/3.16; 356/152

[51] Int. Cl.² ...................... G01J 1/20; F41G 7/00

[58] Field of Search ...................... 250/203 R, 236; 102/70.2; 244/3.16; 356/152

[56] References Cited

UNITED STATES PATENTS

| | | | |
|---|---|---|---|
| 2,431,510 | 11/1947 | Salinger | 244/14.3 X |
| 2,870,671 | 1/1959 | Falconi | 250/236 X |
| 2,930,894 | 3/1960 | Bozeman | 244/14.3 X |
| 2,953,962 | 9/1960 | Argyle | 244/14.3 |
| 2,967,247 | 1/1961 | Turck | 250/203 |
| 2,969,018 | 1/1961 | Erst et al. | 244/14.3 X |
| 3,069,546 | 12/1962 | Buntenbach | 250/83.3 |

*Primary Examiner*—Maynard R. Wilbur
*Assistant Examiner*—S. C. Buczinski
*Attorney, Agent, or Firm*—Robert D. Sanborn

EXEMPLARY CLAIM

1. In a radiant energy tracking device sensitive to radiation of scanned targets the combination of;
    optical focusing means having an optical axis for receiving modulated signal pulses reflected from a target and forming a target image at a focal point,
    means for nutating said image in the focal plane about said optical axis,
    detector means comprising four surfaces, each surface occupying a quadrant in the circle encompassed by said image as it nutates about said optical axis,
    said detector means providing an output pulse for each of said quadrants, the pulse width being indicative of the duration of said target image on each said surface, and
    summing means responsive to said output signals for providing signals proportional to the deviation of said target from said optical axis.

5 Claims, 5 Drawing Figures

RADIANT ENERGY TRACKING DEVICE

This invention relates to radiant energy tracking systems and more particularly to an infrared angular tracking device.

Radiant energy tracking devices for locating targets in the air from ground locations must be insensitive to intensity shimmer modulation of the incoming infrared energy if substantial accuracy is to be realized. Additionally, an infrared tracker must be able to discriminate against various backgrounds such as horizons, clouds, fires, and other heat generating devices. Further, the device must be able to discriminate against daylight background energy.

The operation of an infrared tracker near the earth's surface is subject to the serious problem of atmospheric shimmer modulation of the target source signal. In a system for tracking a target emanating a radiant energy signal the intensity shimmer of the signal from the source produces an amplitude modulation of the incoming infrared signal at the tracker which is a percentage of the signal strength. Therefore, efforts to reduce the intensity shimmer by increasing the strength of the source or the sensitivity of the tracking detector are bound to fail.

Prior art infrared tracking systems for tracking a source of radiant energy from the ground have employed amplitude modulation techniques wherein the incoming infrared energy from the modulated source is amplitude modulated to indicate the distance between the source and an established line of sight of the tracking device. The accuracy and reliability of amplitude modulated devices are seriously affected by the production of amplitude modulation of the carrier signal due to the atmospheric shimmer effect. The incoming signal from the source has a built-in noise due to atmospheric shimmer which is amplitude modulated by the tracker electronics to effect an increase in the noise level of the device. This produces an ineffective and inaccurate tracking device unable to meet the increasing requirements of precision and reliability. Accordingly, it is an object of this invention to provide an infrared tracking device of improved accuracy and reliability.

The device of this invention overcomes the above-noted and other disadvantages of the prior art by providing a pulse duration modulated system which substantially eliminates the effect of atmospheric shimmer. By utilizing a time modulation system to detect the displacement of an infrared target source from an established line of sight the noise effects from intensity shimmer and other causes can be effectively eliminated. The device of this invention is not only insensitive to intensity shimmer modulation but also allows discrimination between the target source and other heat generating background noises such as horizontal clouds and fires.

It is therefore another object of this invention to provide an infrared tracking system in which the signal from the infrared source is time modulated to detect the angular error between the source and an established line of sight.

It is a further object of this invention to provide an infrared tracking device for increasing the signal to noise ratio of the incoming radiant energy signal.

Figure 2:
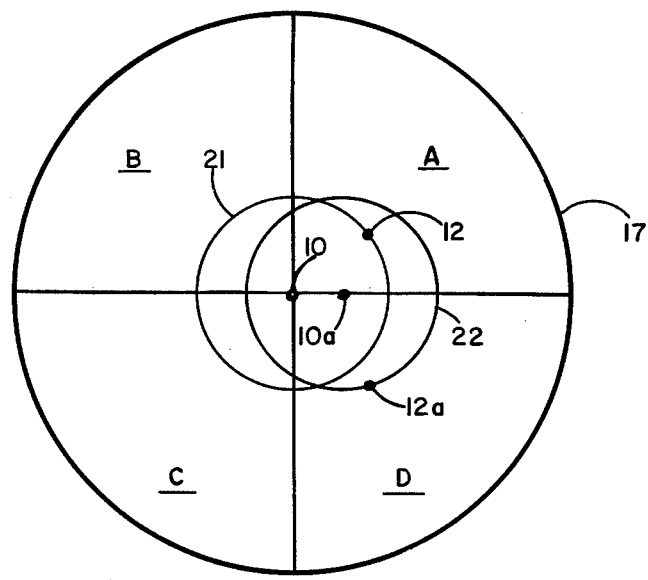
Figure 3:
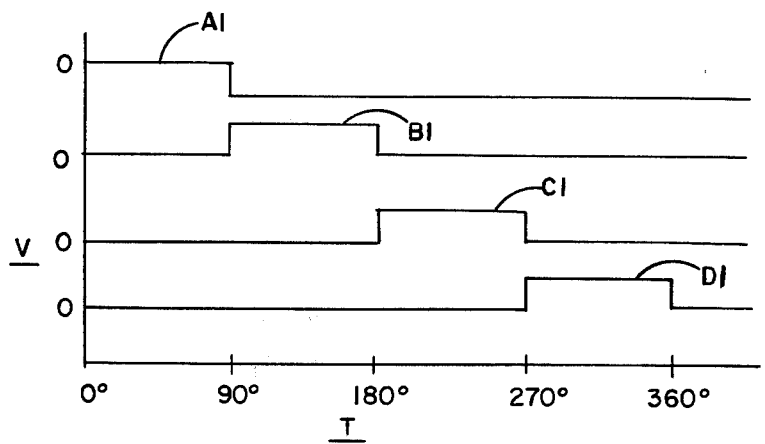
Figure 4:
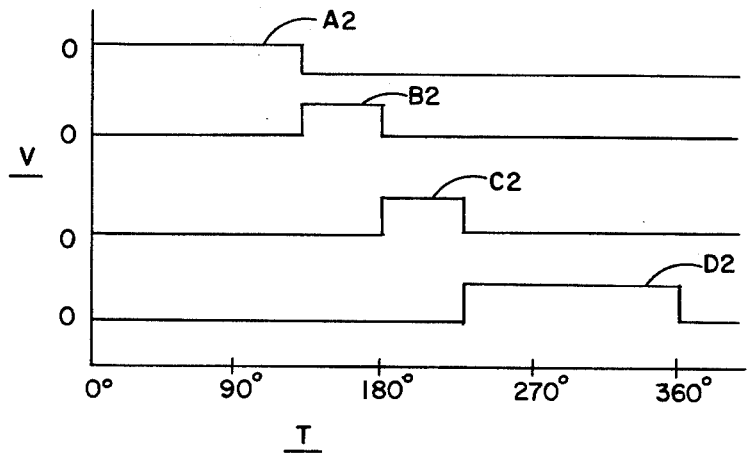
Figure 5:
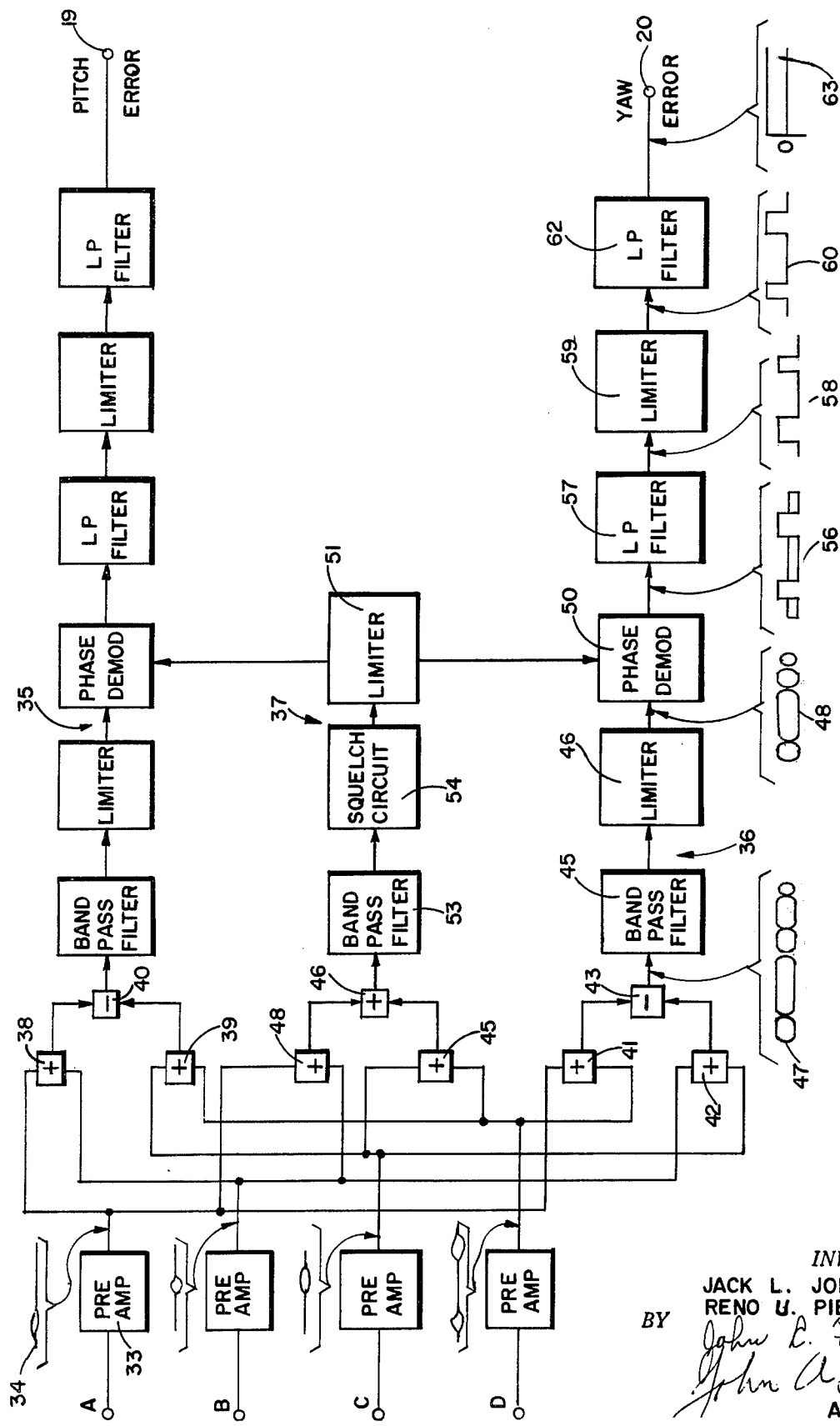

Other objects of the invention will become apparent from the following description read in conjunction with the accompanying drawings, in which:

FIG. 1 is a diagram in schematic and block form illustrating the principles of the invention, FIG. 2 is a view of the infrared detector of the invention showing the path of the target image on the detector surfaces, FIG. 3 illustrates the wave forms of the output of the detector when the target source is on the line of sight axis of the detector, FIG. 4 illustrates wave forms of the output of the detector when the target is off the line of sight axis, and FIG. 5 is a schematic in block diagram of the electrical circuit for receiving the output of the detector.

According to a principle aspect of the invention there is provided a tracking device sensitive to radiation of scanned targets. An optical system disposed along an optical axis corresponding to a predetermined line of sight axis receives modulated infrared signal pulses reflected from a target in space. Means are included for measuring the time duration of the pulses to provide signals proportional to the angular deviation of the target from the line of sight axis.

According to another aspect of the invention the signal pulses are produced by nutating a target image, formed in the optical system, in a focal plane about the optical axis. A detector comprising four quadrant surfaces separated and disposed in the focal plane provides pulse signals at each of the surfaces which produce signals proportional to the horizontal and vertical deviation of the target from the optical axis.

Referring now to the drawings for a more detailed understanding of the invention, and particularly to FIG. 1, there is shown an infrared tracking system for determining the distance of a target source from a predetermined line of sight or optical axis 10. The incoming signal from a modulated target source (not shown) is focused in the optical system wherein an aperture lens 11 forms a target image 12 at the focal point of the optical system. The target image 12 is deflected from the optical axis 10 and nutated in a circular pattern by means of a pair of optical wedges 13 and 14. A differential drive control 15 guided by a program control 16 rotates the optical wedges 13 and 14 so that the target image 12 is nutated in a circular pattern about the optical axis 10 when the target source is on the line of sight axis. The field of view is regulated and determined by a field stop 9, which may be an ordinary camera iris, controlled by the differential drive control 15 in accordance with predetermined controls from the program control 16.

The target image 12 is nutated in a focal plane 21 normal to the optical axis 10. A radiant energy detector 17 which may be in the form of a core, has four detector surfaces indicated as A, B, C, and D disposed in the focal plane to receive the incoming signal from the target source. The surfaces A, B, C, and D are preferably adjacent to each other to form a cross where their surfaces adjoin. The summing matrix 18 responsive to the output signals from the detector surfaces, A, B, C, and D provides signals at the terminals 19 and 20 indicative respectively of the vertical deviation of the target from the optical axis and the horizontal deviation from the optical axis. Thus, the terminal 19 yields a pitch error signal and the terminal 20 presents a yaw error signal.

The target image 12 is nutated about the detector surfaces A, B, C, and D at a predetermined rate so that it describes a circle on the surfaces. The surfaces A, B, C, and D each form a quadrant of the circle inscribed by the movement of the target image. The function of time the target image 12 spends on each of the detectors A, B, C, and D determines the vertical and horizontal deviation of the target from the optical axis 10. Thus, a pulse duration system is provided in which the information resides in the duration or width of the output pulses from the detectors A, B, C, and D.

The detector surfaces A, B, C, and D consist of a suitable radiant energy sensitive material such as Indium Antimonide which has a low system noise characteristic. The sensitivity of the detectors is relatively independent of their surface area because of the extremely low noise level characteristics of the detector material. Therefore, the dwell duty cycle of the target image on the detector surfaces may be increased to the point wherein the four surfaces A, B, C, and D include substantially the entire area encompassed by the target image 12 as it nutates. The sensitivity of the tracker is thereby improved without an undesirable increase in noise.

Referring now to FIG. 2 a view of the detector 17 of FIG. 1, there is shown a circular path 21 upon which the target image 12 is nutated in accordance with the system described in FIG. 1. The path 21 is the path which the image 12 will follow when the target source is exactly on the optical axis 10. The duration of the target image 12 on each of the quadrant detectors A, B, C, and D is equal since the center of the circle inscribed by the path 21 is on the optical axis 10. This is an indication that the target source is on the axis 10. There is also shown in FIG. 2 a path 22 followed by the target image 12a when the target source is not on the optical axis 10. For example, as shown by path 22 a target has substantially zero vertical deviation and a considerable horizontal deviation from the optical axis 10. Thus, it may be seen in FIG. 2 that the image 12 spends more time on the surfaces A and D and less time of the surfaces B and C.

Referring now to FIGS. 3 and 4 illustrating the wave forms of the output of the detector 17, for the paths 21 and 22 of FIG. 2, there is shown in FIG. 3 the wave forms $A_1$, $B_1$, $C_1$, and $D_1$, respectively indicative of the outputs of the detector surfaces A, B, C, and D when the target image 12 is on the path 21 in FIG. 2. As can readily be seen in FIG. 3 the time duration or width of the output pulses from each of the detectors is equal for a cycle beginning at 0° and ending at 360°. This is indicative of the fact that the target image is spending an equal time on each of the surfaces A, B, C, and D and that the target source is exactly on the optical axis 10.

In FIG. 4, the waveforms $A_2$, $B_2$, $C_2$, and $D_2$, illustrate the outputs of the surfaces A, B, C, and D when the target image 12 is nutating about an axis 10a on the path 22. Thus, the width of the pulses $B_2$ and $C_2$ is smaller than the width of pulses $A_2$ and $D_2$. In other words, the time duration of the image 12 is less on surfaces B and C than it is on A and D. An analysis of the output signals produced by the waveforms in FIG. 4 by the summing matrix 18 of the system in FIG. 1 will produce output error signals indicative of the amount and duration of deviation of the target source on the axis 10a from the optical axis 10.

Referring now to the FIG. 5, a schematic block diagram of the electrical circuit of the summing matrix 18, there is shown the terminals A, B, C, and D corresponding to the terminals in FIG. 1 at the input of the summing matrix 18 from the respective detector surfaces A, B, C, and D. The signals at each of the terminals A, B, C, and D are fed to pre-amplifiers such as an amplifier 33 which amplify the incoming modulated signals to produce a signal such as shown for example by the waveform enclosed in 34. The output of the pre-amplifiers are fed to a summing network in which the signals are combined to provide output signals to a pitch error channel circuit 35, a yaw error channel circuit 36, and a reference channel circuit 37. The pitch error channel 35 having summing means 38 and 39 and subtracting means 40 combines the outputs of the pre-amplifiers in the relation $(A + B) - (C + D)$ to provide a signal at the output of difference means 40 indicative of the direction and amount of vertical deviation of the target source from the optical axis.

The yaw error channel circuit 36 is provided with summing means 41 and 42 and subtracting means 43 which combine the outputs from the pre-amplifiers in the relation $(A + D) - (B + C)$ to present a signal at the output of the subtracting means 43 as shown for example by the waveform 47 which is proportional to the horizontal deviation of the target from the optical axis.

The reference channel 37 having summing means 44, 45, and 46 produces a signal at the output of summing means 46 which is a summation of all the outputs $A + B + C + D$. This reference signal is a phase reference signal used to maintain synchronism between the signals in the pitch channel 35 and the yaw channel 36.

In the yaw channel 36 the output signal from subtracting means 43 is presented to a band pass filter 45 which compensates for the effects of phase shift due to any change in the modulation rate of the target source or any drift caused by changes in the characteristics of the components of the optical system. The output of the band pass filter 45 is then fed to a limiter 46 which provides amplitude linearity eliminating noise input signals. This can be accomplished in the system of the invention because the width of the incoming signal is measured and not the amplitude. The amplitude limited signal at the output of limiter 46, shown for example by the waveform enclosed in 48, is fed to a phase demodulator 50 which synchronously demodulates the signal from the limiter 46 in accordance with a reference signal provided by a limiter 51 in the reference channel 37. A phase reference signal is developed in the channel 37 wherein the output of the summing means 46 is fed through a band pass filter 53 and a squelch circuit 54 to the limiter 51. One output of the limiter 51 is fed to the phase demodulator 50 to provide a phase reference signal.

The output of the demodulator 50, shown for example by the waveform enclosed by 56, is filtered by a low pass filter 57 which provides an output, shown for example by the waveform enclosed by 58, which is a unidirectional signal indicative of the horizontal deviation of the target from the optical axis 10. The output of the filter 57 is fed to a limiter 59 which provides a signal at its output, shown for example by the waveform enclosed by 61, which when filtered by a low pass filter 62 provides an output signal at terminal 20 which, as is shown, for example, by the waveform enclosed by 63, is a direct current signal which is proportional to the time duration of the outputs of the detector surfaces A, B, C, and D. Thus, as shown for example by the waveform enclosed by 63, a substantial horizontal deviation error signal is produced.

The pitch error channel circuit 35 operates in a like manner as described for the yaw channel 36 receiving an output signal from the subtracting means 40 and providing through electronic circuitry corresponding to the circuitry in the yaw channel 36 an output signal at the terminal 19 indicative of the vertical deviation of the target source from the optical axis 10.

Thus, it may be seen that by providing a pulse duration modulated system wherein the time spent by a target image on each of the four detector surfaces A, B, C, and D, arranged in the quadrants of a circle inscribed by the target image as it nutates, eliminates intensity shimmer and other errors due to background noises. As can readily be ascertained from the waveforms shown in FIG. 5 noise levels produced in the signals are readily filtered out by the channel circuitry without losing any of the information indicative of the deviation of the target from the line of sight. Therefore, a highly accurate and reliable system is provided for measuring the deviations of the target source from the line of sight.

The particular advantage of the pulse duration modulation system of the invention is the ability to eliminate noise in the electronics processing circuitry without affecting accuracy and reliability. This cannot be achieved in prior art devices which must carry the noise and signals in proportionate amounts throughout the entire system.

As described in this specification a radiant energy tracking system has been provided to track an infrared source such as may occur wherein it is desired to guide a missile with an infrared source from a ground tracking unit. It is to be realized that the infrared tracker of the device may be readily utilized in other systems for tracking any radiant energy source. Although as described in this system it is assumed that the infrared source is modulated at the target before it is presented to the optical system as shown in FIG. 1, it is readily apparent to one skilled in the art that if it is desired to track a radiant energy source such as an enemy missile, means can easily be provided in the system of FIG. 1 for modulating the incoming source. Thus, the system described in this invention is applicable to the tracking of any radiant energy source.

Although the invention has been described and illustrated in detail, it is to be clearly understood that the same is by way of illustration and example only and is not to be taken by way of limitation, the spirit and scope of this invention being limited only by the terms of the appended clause.

We claim:

1. In a radiant energy tracking device sensitive to radiation of scanned targets the combination of;
   optical focusing means having an optical axis for receiving modulated signal pulses reflected from a target and forming a target image at a focal point,
   means for nutating said image in the focal plane about said optical axis,
   detector means comprising four surfaces, each surface occupying a quadrant in the circle encompassed by said image as it nutates about said optical axis,
   said detector means providing an output pulse for each of said quadrants, the pulse width being indicative of the duration of said target image on each said surface, and
   summing means responsive to said output signals for providing signals proportional to the deviation of said target from said optical axis.

2. The combination recited in claim 1 wherein said summing means includes a pitch channel circuit responsive to the sum of the signals for the first and second quadrants and the sum of the signals for the third and fourth surfaces for providing a signal indicative of the horizontal deviation of said target from said optical axis, and a yaw channel circuit responsive to the sum of the signals from the first and fourth quadrant at the sum of the signal for the second and third quadrants for providing a signal indicative of the vertical deviation of said target from said optical axis and limiting means in each of said pitch and yaw channel circuits for respectively providing an amplitude limited signal indicative of the horizontal and vertical duration of said target from said optical axis.

3. In a radiant energy tracking device sensitive to radiation of scanned targets the combination of;
   an optical system having an optical axis and including an objective lens for forming a target image at a focal point,
   a pair of optical wedges disposed along said optical axis,
   differential drive control means operatively connected to said optical wedges for causing said image to nutate in a focal plane,
   a field stop disposed along said optical axis and responsively connected to said differential drive control means for varying the field of view of said optical system,
   a detector having four quadrant surfaces in said focal plane encompassed by said image as it nutates, and
   a summing matrix responsive to the outputs of said surfaces for providing pulse signals whose widths are indicative of the horizontal and vertical deviation of the target from said optical axis.

4. The combination recited in claim 3 wherein said summing matrix includes a pitch channel circuit having first summing means for summing the signals for said first and second quadrants, second summing means for summing the signals from said third and fourth quadrants, means for subtracting the outputs of said first and second summing means limiter means responsive to the output of said subtracting means for providing an amplitude limited signal indicative of the vertical deviation of said target, a reference channel circuit responsive to the sum of the signals from all of said quadrants to provide a phase reference signal, and means responsive to the output of said limiter means and said reference channel circuit for phase demodulating said amplitude limited signal in accordance with said phase reference signal.

5. The combination recited in claim 3 wherein said summing matrix includes a yaw channel circuit having first summing means for summing the signals from said first and fourth quadrant, second summing means for summing the signals from said second and third quadrants, means for subtracting the outputs of said first and second summing means, limiter means responsive to the output of said subtracting means for providing an amplitude limited signal indicative of the vertical deviation of said target, a reference channel circuit responsive to the sum of the signals from all of said quadrants to provide a phase reference signal, and means responsive to the output of said limiter means and said reference channel circuit for phase demodulating said amplitude limited signal in accordance with said phase reference signal.

* * * * *